Figure 1:
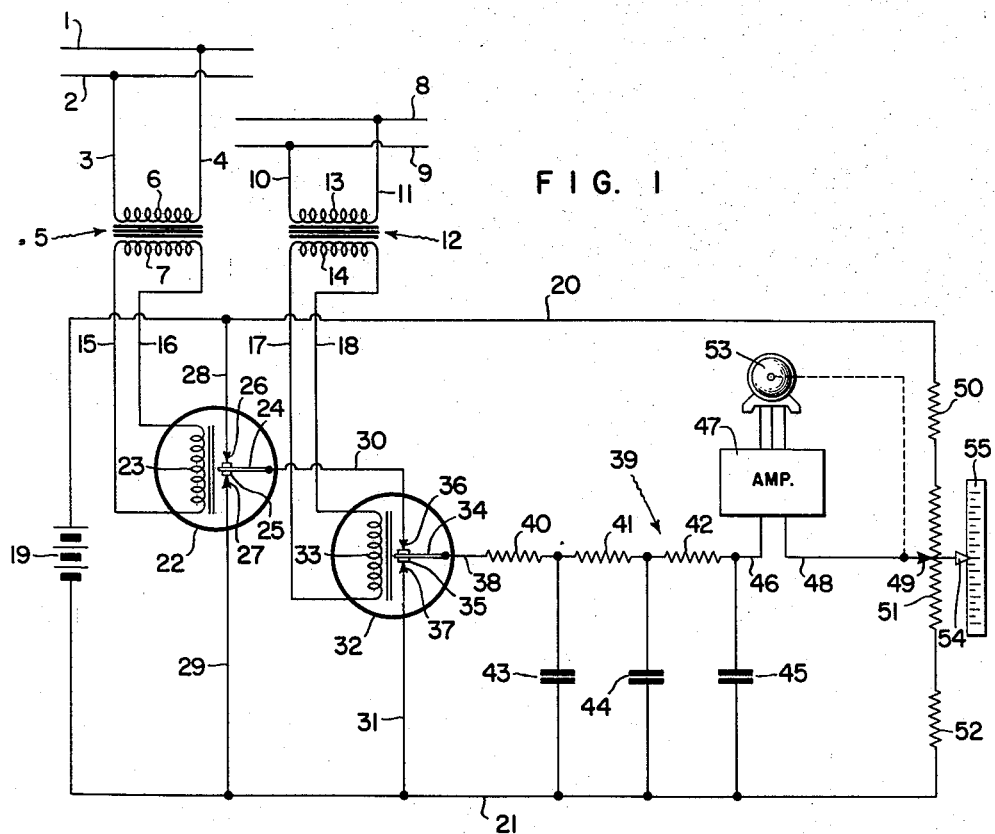

June 14, 1960

R. L. MILLER 2,941,146

ELECTRICAL MEASURING APPARATUS

Filed Feb. 13, 1957

*INVENTOR.*
ROBERT L. MILLER

BY Arthur H. Swanson

ATTORNEY.

2,941,146
ELECTRICAL MEASURING APPARATUS

Robert L. Miller, Hatboro, Pa., assignor to Minneapolis-Honeywell Regulator Company, Minneapolis, Minn., a corporation of Delaware Filed Feb. 13, 1957, Ser. No. 639,873

4 Claims. (Cl. 324—83)

This invention relates to electrical measuring apparatus and more particularly to electrical apparatus for measuring the phase angle between two alternating signals.

A general object of this invention is to provide a new and improved electrical measuring apparatus which is capable of producing an output signal proportional to the phase angle between two alternating input signals.

A specific object of this invention is to provide a new and improved electrical measuring apparatus which is capable of producing and exhibiting by so-called power set means an output signal proportional to the phase angle between two alternating voltages.

Another specific object of this invention is to provide a new and improved electrical measuring apparatus which is capable of producing an output signal proportional to the phase angle between the alternating current component and the alternating voltage component in an alternating signal.

A further specific object of this invention is to provide a new and improved electrical measuring apparatus which is capable of producing a direct current voltage proportional to the phase angle between two alternating signals.

A still more specific object of this invention is to provide a phase angle measuring apparatus in which two synchronous contacting vibrators, each of which has a contact driving means energized by one of two alternating signals, are serially connected through the vibrator contacts to a source of direct signal potential to produce a direct signal potential proportional to the phase angle between the two alternating signals.

This invention is particularly adapted to the field of electrical measurement in which it is desirable to produce a direct current voltage which is proportional to an alternating current phase angle function and which can be utilized to advantage in conjunction with an indicating or recording potentiometer of the continuous-balance type.

In a preferred apparatus embodiment of the present invention, two synchronous contacting vibrators are provided, each having a contact driving means energized by one of the two alternating signals and associated with a source of direct potential, an averaging circuit and an indicating potentiometer circuit. The averaging circuit is alternately connected to and disconnected from the source of direct potential through the serially connected contacts of the two contacting vibrators. The averaging circuit is connected to the source of direct potential only for that portion of time when the alternating signals which energize the vibrators are both on their respective positive half cycles. Therefore, a direct signal potential proportional to the phase angle between the two alternating signals will be produced on the averaging circuit. This direct signal potential will be a maximum when both alternating signals are in phase and will be zero when the two alternating signals are 180° out of phase. A potentiometer circuit which is utilized to provide a continuous indication and/or record of the magnitude and changes in magnitude of the said direct signal potential, has its output connected to the averaging circuit to produce a direct current potential on the output to oppose and, when suitably adjusted, to balance the direct signal potential on the averaging circuit. The slide-wire contactor in the potentiometer circuit, which is adjusted to balance the direct signal potential on the averaging circuit, is associated with an indicator pointer and a suitably graduated scale which may be marked to indicate the phase angle directly.

As those skilled in the art will understand, the two alternating signals may be two separate alternating voltage signals whose phase relationship it is desired to determine, or they may be the alternating voltage component and the alternating current component of an alternating signal in a single pair of conductors.

Figure 2:
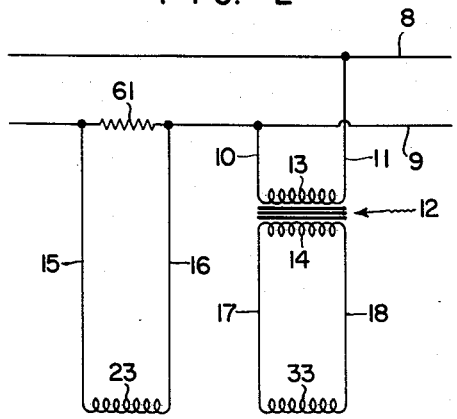

A better understanding of the present invention may be had from the following description read with reference to the accompanying drawings of which:

Fig. 1 is an illustration of the present invention for measuring the phase angle between two alternating voltages; and Fig. 2 is an illustration of the modifications of the connections to Fig. 1 to adapt the apparatus of Fig. 1 for measuring the phase angle between the alternating voltage component and the alternating current component in an alternating signal.

Referring to Fig. 1, the numerals 1 and 2 represent a suitable power line carrying an alternating voltage signal whose phase relationship to the alternating voltage signal carried by the conductors 8 and 9 is to be measured. A primary winding 6 of a transformer 5 is connected across the power lines 1 and 2 by a pair of leads 3 and 4. A secondary winding 7 of the transformer 5 is connected to a driving coil 23 of a synchronous contacting vibrator 22 by a pair of leads 15 and 16. The vibrator 22 comprises the driving coil 23, a single pole double throw switch blade 24 having a pair of contacts 25, and a pair of fixed contacts 26 and 27. The synchronously driven vibrator 22 may well take the form of the vibrator disclosed in the patent to F. W. Side, No. 2,423,524, issued July 8, 1947. The vibrator 22 is arranged to have equal contact percentages with a negligible transit time between contacts.

A primary winding 13 of a transformer 12 is connected across a pair of conductors 8 and 9 by a pair of leads 10 and 11. A secondary wniding 14 of the transformer 12 is connected to a driving coil 33 of a synchronous contacting vibrator 32 by a pair of leads 17 and 18. The vibrator 32 is similar in its mechanical and electrical characteristics to the vibrator 22. The vibrator 32 comprises the driving coil 33, a single pole double throw switch blade 34 having a pair of contacts 35 and a pair of fixed contacts 36 and 37.

An averaging circuit 39 is alternately connected to and disconnected from a source of direct potential 19 by a circuit which may be traced from the positive side of the source of direct potential 19 through a conductor 20, a conductor 28, the contact 26, the contact 25, the blade 24, a conductor 30, the contact 36, the contact 35, the blade 34, and a conductor 38. The averaging circuit 39 is connected to the negative side of the source of direct potential 19 by a conductor 21.

A potentiometer circuit, comprising a slidewire resistor 51, a slidewire contactor 49, and a pair of resistors 50 and 52 in series with the slidewire resistor 51, is connected to the source of direct potential 19 by the conductors 20 and 21.

The known direct signal potential, between the contactor 49 and the lower end of the resistor 52, appearing across the output of the potentiometer circuit, is compared to the direct signal potential appearing across the averaging circuit 39, with the error signal between these two direct signal potentials being applied to a conversion amplifier 47. The output signal of the potentiometer circuit may be traced from the lower end of the resistor 52 to the averaging circuit 39 through the conductor 21, and through the slidewire contactor 49 through a conductor 48 to the conversion amplifier 47. The direct signal potential across the averaging circuit may be traced from the conductor 21 to the lower end of the resistor 52 with a conductor 46 connecting the output of the averaging circuit 39 to the conversion amplifier 47. The error signal between the output of the potentiometer circuit and the output of the averaging circuit is thus applied to the conversion amplifier 47 by the conductors 46 and 48.

The conversion amplifier 47 drives a rebalancing motor 53 which positions the slidewire contactor 49 and a dart or indicator 54 which cooperates with a suitable indicating scale 55 which may be calibrated directly in units or phase angle difference. The rebalancing motor 53 will reposition the slidewire conductor 49 and the indicator 54 until the direct signal potential on the output of the potentiometer circuit equals the direct signal potential appearing across the averaging circuit 39. The conversion amplifier 47 and the rebalancing motor 53 combination may be of the type disclosed in the W. P. Wills Patent, No. 2,423,540, issued on December 1, 1941.

In considering the operation of the apparatus of Fig. 1, it should first be noted that the synchronous vibrator 22 has its driving coil 23 energized directly by the alternating voltage signal originating from the conductors 1 and 2. This driving alternating voltage signal will be effective to drive the blade 24 so as to alternately contact the contacts 26 and 27 with the contacts 25 of the blade 24 at a rate which is the same as the driving frequency applied to the driving coil 23. The contacting time of the contacts 25 with the respective contacts 26 and 27 is adjusted so that the contacts 25 of the blade 24 are engaged with the respective contacts 50% of each cycle for the contact 26 and 50% of each cycle for the contact 27. In like manner, the synchronous vibrator 32 has its driving coil 33 energized directly by the alternating voltage signal originating from the conductors 8 and 9. This driving alternating voltage signal will be effective to drive the blade 34 so as to alternately contact the contacts 36 and 37 with the contacts 35 of the blade 34 at a rate which is the same as the driving frequency applied to the driving coil 33. The contacting time of the contacts 36 and 37 is adjusted so that the contacts 35 of the blade 34 are engaged with the respective contacts 50% of each cycle for the contact 36 and 50% of each cycle for the contact 37. It is understood that the alternating voltage signal energizing the coil 23 and the alternating voltage signal energizing the coil 33 are of the same frequency.

When the switch blades 24 and 34 are both driven in an upward direction so as to engage the contact 25 with the contact 26 and the contact 35 with the contact 36 respectively, the full value of the direct signal potential 19 appears between conductors 21 and 38, the input to the averaging circuit 39, and is impressed on the averaging circuit 39. This circuit may be traced from the positive terminal of the source of direct potential 19 through the conductor 20, the conductor 28, the contact 26, the contact 25, the switch blade 24, the conductor 30, the contact 36, the contact 35, the switch blade 34, and the conductor 38. The conductor 21 is attached directly to the negative terminal of the source of direct potential 19. On the next half cycle of the alternating voltage carried by the conductors 1 and 2 and the alternating voltage carried by the conductors 8 and 9, the blades 24 and 34 will be driven downwardly. With the switch blades 34 and 24 both in a downward position the circuit connecting the source of direct potential 19 to the averaging circuit 39 is opened and the input to the averaging circuit 39 is short circuited in a circuit that may be traced from the conductor 38, the switch blade 34, the contact 35, the contact 37, and a conductor 31 to the conductor 21. This circuit provides a discharge path for the voltage built up on the averaging circuit 39 during the previous half cycle thus enabling the averaging circuit to provide an average of the direct signal potential impressed upon it over each full cycle.

It is evident also that when the switch blade 24 is in a downward position and the switch blade 34 is in an upward position that the circuit connecting the averaging circuit 39 to the source of direct potential 19 will be open and the input to the averaging circuit 39 will be short circuited in a circuit that may be traced from the conductor 38, the switch blade 34, the contacts 35 and 36, the conductor 30, the switch blade 24, the contacts 25 and 27, and a conductor 29 to the conductor 21. Thus it is evident that a discharge path for the averaging circuit 39 is provided when either or both switch blade 24 and switch blade 34 is in a downward position.

When the alternating voltage associated with the conductors 1 and 2 is in phase with the alternating voltage carried by the conductors 8 and 9, the blades 24 and 34 are driven in synchronism so that the full value of the direct signal potential 19 appears across the conductors 21 and 38 for one half of each cycle and the input of the averaging circuit 39 is short circuited, providing a discharge path for the other half of each cycle. When the alternating voltage associated with conductors 1 and 2 and the alternating voltage carried by the conductors 8 and 9 are 180° out of phase with each other, the blade 24 will be in an upward position when the blade 34 is in a downward position and the blade 24 will be in a downward position when the blade 34 is in an upward position so that the circuit previously traced which connects the source of direct potential 19 with the averaging circuit 39 will always be open circuited. Thus, when the two alternating signals are 180° out of phase with each other zero voltage will be impressed on the averaging circuit continuously.

It is evident that when the two alternating signals carried by the conductors 1 and 2, the conductors 8 and 9, are 90° out of phase with each other, that the full value of the direct signal potential will be impressed on the averaging circuit 39 for 25% of each cycle. It is thus evident that the full value of the direct signal potential 19 will be impressed on the averaging circuit 39 for a percentage of each cycle proportional to the phase angle difference between the alternating voltages energizing the driving coils 23 and 33. Thus, the average value of this pulsed direct signal potential impressed on the averaging circuit is a measure of the phase angle difference between the driving alternating voltages.

The direct current pulses on the input of the averaging circuit 39 will be averaged out on the output leads 21 and 46 of the averaging circuit 39. There will thus appear a direct current potential on the output leads 21 and 46 which is directly proportional to the phase angle between the alternating voltage driving the synchronous vibrator 22 and the alternating voltage driving the synchronous vibrator 32. This direct current voltage on the leads 21 and 46 is compared with the direct voltage originating from the contactor 49 of the potentiometer circuit. This potential for the slidewire resistor 51 is derived in a circuit that may be traced from the positive terminal of the source of direct signal potential 19 through the conductor 20, the resistor 50, the slidewire resistor 51, the resistor 52, and the conductor 21 back to the negative terminal of the source of direct potential 19. The direct current potential on the lead 46 is applied to one input terminal of the conversion amplifier 47. The potential of the slidewire resistor contactor 49 is applied by way of the conductor 48 to the other input terminal of the conversion amplifier 47. If there is a difference in the magnitudes of the direct current potentials applied to the two amplifier input terminals by the conductors 46 and 48, the conversion amplifier 47 will convert this direct current potential difference to an alternating signal, amplify it, and produce a motor drive signal energizing the rebalancing motor 53 causing the rebalancing motor 53 to be driven in a direction to move the slidewire contactor 49 to a position which will cause the direct current potential between the amplifier input terminals to be reduced to zero.

If the phase angle between the alternating voltages carried by the conductors 1 and 2 and the alternating voltage carried by the conductors 8 and 9 should decrease, the vibrators 22 and 32 will follow this decrease and produce pulses of a longer duration on the input of the averaging circuit 39. This will mean that the voltage appearing at the output of the averaging circuit 39 on the leads 21 and 46 will be increased. This increase in voltage of the output leads 21 and 46 of the averaging circuit 39 will result in an unbalance on the input to the conversion amplifier 47, and there will be a resultant motor drive signal causing the motor 53 to drive the slidewire resistor contactor 49 in an upward direction so as to provide a balancing signal. As will be readily apparent, the output operation of the motor 53 may also be used to produce the desired controlling action as well as provide the indication obtained by the use of the dart 54 movable over the scale 55.

If the phase angle between the alternating voltage carried by the conductors 1 and 2 and the alternating voltage carried by the conductors 8 and 9 should increase, the operation assumed above upon a decrease will be reversed and the motor 53 will be effective to drive the slidewire resistor contactor 49 in the opposite direction and provide a balancing signal.

While the apparatus illustrated in Fig. 1 is connected for measuring the phase angle between two alternating voltages, it is evident that it can be utilized for measuring the phase angle between the alternating voltage component and the alternating current component of an alternating signal in a single pair of conductors.

Fig. 2 illustrates the necessary connections to the coils 23 and 33 of the vibrators 22 and 32 to measure the phase angle between the alternating current component and the alternating voltage component of the alternating signal in the conductors 8 and 9. The connections to the coil 33 of the vibrator 32 are the same in Fig. 2 as in Fig. 1 so that the coil 33 is energized by the alternating voltage component of the alternating signal in the conductors 8 and 9. The coil 23 of the vibrator 22 is serially connected to the conductor 9 by the leads 15 and 16 with a suitable resistor 61 shunting the coil 23. The coil 23 thus is energized by the alternating current component of the conductors 8 and 9. The remainder of the apparatus of Fig. 1 remains the same for the measurement desired in Fig. 2. It is evident that when the alternating voltage component and the alternating current component of the alternating signal carried by the conductors 8 and 9 are in phase that the remainder of the apparatus of Fig. 1 when connected in the manner of Fig. 2 will respond exactly as described for the condition when the alternating voltage of the conductors 1 and 2 is in phase with the alternating voltage of the conductors 8 and 9 as illustrated in Fig. 1. Also in all other respects, as the phase angle between the alternating current component and the alternating voltage component of the alternating signal carried by the conductors 8 and 9 varies, the remainder of the apparatus of Fig. 1, when connected as in Fig. 2, will respond exactly in the manner described in the apparatus in Fig. 1 for the variation of the phase angle between the alternating voltage of the conductors 1 and 2 of the alternating voltage of conductors 8 and 9.

What is claimed is:

1. A phase angle measuring apparatus comprising a first synchronous contacting vibrator having contacts and a contact driving means, said contact driving means arranged for direct connection to a first alternating signal source, a second synchronous contacting vibrator having contacts and a contact driving means, said contact driving means of said second vibrator arranged for direct connection to a second alternating signal source, the signals of both of said first and second signal sources being of the same frequency, a pair of terminals adapted for connection to a source of direct current potential, an averaging circuit having an input and an output, a circuit means including the contacts of said first and second vibrators operative alternately to connect said input of said averaging circuit to said pair of terminals and to a discharging circuit to produce on said output of said averaging circuit a direct current potential proportional to the phase angle between said first and second alternating signals, and a potentiometer circuit connected between said terminals and energized therefrom and having an adjustable member the potential of which with respect to one of said terminals is determined by its adjusted position, and means responsive to the potential difference between the last mentioned potential and said potential on said averaging circuit output for adjusting said adjustable member to the position at which said potential difference is reduced substantially to zero, whereby said position of said adjustable member is representative of said phase angle.

2. A phase angle measuring apparatus comprising a first synchronous contacting vibrator having contacts and a contact driving means, said contact driving means arranged to be energized by the alternating voltage component of an alternating signal, a second synchronous contacting vibrator having contacts and a contact driving means, said contact driving means of said second vibrator arranged to be energized by the alternating current component of said alternating signal, a pair of terminals adapted for connection to a source of direct current potential, an averaging circuit having an input and an output, circuit means including said contacts of said first and second vibrators operative alternately to connect said averaging circuit input to said pair of terminals and to a discharging circuit to produce on said averaging circuit output a direct current potential proportional to the phase angle between said alternating voltage component and said alternating current component, a potentiometer circuit comprising a slidewire resistor connected between said terminals and having an adjustable contact, and means responsive to the potential difference between said potential on said averaging circuit output and the potential between said adjustable contact and one of said terminals and operative to adjustable contact to the position along said slidewire at which said potential difference is reduced substantially to zero, whereby said position of said adjustable contact is representative of said phase angle.

3. A phase angle measuring apparatus comprising a first synchronous contacting vibrator having an energizing winding adapted for direct connection to a first alternating signal source, said first vibrator comprising a single pole double throw switch, a second synchronous contacting vibrator having an energizing winding adapted form direct connection to a second alternating signal source, the signals of both of said first and second signal sources being of the same frequency, said second vibrator comprising a single pole double throw switch, a direct current source of potential having two terminals, an averaging circuit having an input and an output, circuit means including the serially connected single pole double throw switches of said first and second vibrators alternately to connect said averaging circuit input to said direct current potential source and to a discharging circuit to produce on said averaging circuit output a direct current potential proportional to the phase angle between said first and second alternating signals, and a direct current potential measuring means connected to said averaging circuit output comprising a slidewire resistor connected between said terminals and having an adjustable contact, and means responsive to the potential difference between said potential on said averaging circuit output and the potential between said adjustable contact and one of said terminals and operative to adjust said adjustable contact to the position along said slidewire at which said potential difference is reduced substantially to zero, whereby said position of said adjustable contact is representative of said phase angle.

4. A phase angle measuring apparatus comprising first and second synchronous contacting vibrators, each of which has a movable contact, first and second cooperating stationary contacts, and contact driving means operative, when energized by an alternating energizing signal, to cause said movable contact to engage said cooperating stationary contacts alternately in synchronism with the alternations of the alternating energizing signal, first and second conductors for connection across a source of D.C. energizing voltage, means connecting said driving means of said first vibrator to a first alternating signal source, means connecting said driving means of said second vibrator to a second alternating signal source, the signals of both of said first and second signal sources being of the same frequency, means connecting said first and second stationary contacts of said first vibrator to said first and second conductors, respectively, means connecting said movable contact of said first vibrator to said first stationary contact of said second vibrator, means connecting said second stationary contact of said second vibrator to said second conductor, an averaging circuit having an input terminal, an output terminal, and a common terminal, means connecting said input terminal to said movable contact of said second vibrator, means connecting said common terminal to said second conductor, a slidewire resistor connected between said conductors and having an adjustable contact, and signal responsive means having an input circuit connected between said output terminal and said adjustable contact, having a mechanical output connection to said adjustable contact, and operative to adjust the latter along said resistor to maintain substantially zero signal across said input circuit, whereby the adjusted position of said adjustable contact is a measure of the phase angle between the two alternating signals respectively supplied to said two driving means.

References Cited in the file of this patent

Publication, "Electromechanical Phase Indicator," RCA Engineering Dept. (pages 14–15), July 1949.

Publication, "Phase Transducer Uses High-Speed Relay," Electronics (pages 234 and 236), January 1954.